(12) United States Patent  
Miller et al.

(10) Patent No.: US 7,852,838 B2  
(45) Date of Patent: Dec. 14, 2010

(54) METHOD AND APPARATUS FOR SELECTIVELY REDIRECTING SESSION CONTROL FOR AN INTERNET PROTOCOL MULTIMEDIA SUBSYSTEM

(75) Inventors: Trent J. Miller, West Chicago, IL (US); Uri S. Baniel, Highland Park, IL (US); Jheroen P. Dorenbosch, Paradise, TX (US); James P. Kovac, Streamwood, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1116 days.

(21) Appl. No.: 11/301,415

(22) Filed: Dec. 13, 2005

(65) Prior Publication Data

US 2007/0133517 A1    Jun. 14, 2007

(51) Int. Cl.  
*H04L 12/28* (2006.01)
(52) U.S. Cl. .................. 370/389; 370/331; 370/352; 370/392; 370/401
(58) Field of Classification Search ............... 370/331, 370/352, 389, 392, 401  
See application file for complete search history.

(56) References Cited

U.S. PATENT DOCUMENTS

| | | | |
|---|---|---|---|
| 6,888,828 B1 * | 5/2005 | Partanen et al. | 370/389 |
| 2004/0068574 A1 * | 4/2004 | Costa Requena et al. | 709/230 |
| 2004/0196867 A1 * | 10/2004 | Ejzak et al. | 370/468 |
| 2004/0243711 A1 * | 12/2004 | Rajaniemi | 709/227 |
| 2006/0120362 A1 * | 6/2006 | Westman et al. | 370/389 |
| 2007/0071221 A1 * | 3/2007 | Allen et al. | 379/265.01 |

OTHER PUBLICATIONS

3GPP TS 23.228 v5.13.0 (Dec. 2004), $3^{rd}$ Generation Partnership Project; Technical Specification Group Services and System Aspects; IP Multimedia Subsystem (IMS); Stage 2, (Release 5), pp. 1-131.

* cited by examiner

*Primary Examiner*—Barry W Taylor

(57) ABSTRACT

A method and apparatus for selectively redirecting session control for a user equipment in a telecommunication system include: a home server (108), a proxy server (204, 206), and a user equipment (202) for transmitting a breakout request (208, 210) to the proxy server (204, 206) to break out of an initial service route that includes the home server (108) to a direct service route that bypasses the home server (108).

23 Claims, 13 Drawing Sheets

700

702

INVITE sip:John.Doe@domain.com SIP/2.0

Via: SIP/2.0/UDP [1080::8:800:200C:417A]:5059;comp=sigcomp;branch=z9hG4b543fg]

Max-Forwards:

Route: <sip:pcscf1.visitedmarket.net:5058;lr;comp=sigcomp>,  } 704
      <sip:orig@scscf1.domain2.com;lr>

P-Preferred-Identity: "Paul Smith" <sip:paul@domain2.com>

Privacy:

P-Access-Network-Info:

From: Paul <sip:Paul.Smith@domain2.com>;tag=ty20s — 706

To: John <sip:John.Doe@domain.com> — 708

Call-ID:

CSeq:   INVITE

Require:

Proxy-Require:

Supported:

Security-Verify:

Contact: <sip:[1080::8:800:200C:417A]:5059;comp=sigcomp>

Allow:

Content-Type:

Content-Length:

```
INVITE sip:John.Doe@domain.com SIP/2.0        ← 702
Via: SIP/2.0/UDP [1080::8:800:200C:417A]:5059;comp=sigcomp;branch=z9hG4b543fg]
Max-Forwards:
Route: <sip:pcscf1.visitedmarket.net:5058;lr;comp=sigcomp>,  ⎫
       <sip:orig@scscf1.domain2.com;lr>                       ⎬ 704
                                                              ⎭
P-Breakout-Route: <sip:application-server@visitedmarket.net;lr>  ← 802
P-Preferred-Identity: "Paul Smith" <sip:paul@domain2.com>
Privacy:
P-Access-Network-Info:
From: Paul <sip:Paul.Smith@domain2.com>;tag=ty20s  ─ 706
To: John <sip:John.Doe@domain.com>  ─ 708
Call-ID:
CSeq: INVITE
Require:
Proxy-Require:
Supported:
Security-Verify:
Contact: <sip:[1080::8:800:200C:417A]:5059;comp=sigcomp>
Allow:
Content-Type:
Content-Length:
 . . .
```

FIG. 8

```
INVITE sip:John.Doe@domain.com SIP/2.0          ~ 702
Via: SIP/2.0/UDP [1080::8:800:200C:417A]:5059;comp=sigcomp;branch=z9hG4b543fg]
Max-Forwards:
Route: <sip:pcscf1.visitedmarket.net:5058;lr;comp=sigcomp>,
       <sip:application-server@visitedmarket.net;lr>      } 902
P-Preferred-Identity: "Paul Smith" <sip:paul@domain2.com>
Privacy:
P-Access-Network-Info:
From: Paul <sip:Paul.Smith@domain2.com>;tag=ty2Us  ~ 706
To: John <sip:John.Doe@domain.com>   ~ 708
Call-ID:
CSeq: INVITE
Require:
Proxy-Require:
Supported:
Security-Verify:
Contact: <sip:[1080::8:800:200C:417A]:5059;comp=sigcomp>
Allow:
Content-Type:
Content-Length:
  . . .
```

FIG. 9

```
INVITE sip:John.Doe@domain.com SIP/2.0  ~ 702

Via: SIP/2.0/UDP [1080::8:800:200C:417A]:5059;comp=sigcomp;branch=z9hG4b543fg]

Max-Forwards:

Route: <sip:pcscf1.visited.market> [Service route vector information
                                    beyond the proxy server omitted]

P-Preferred-Identity: "Paul Smith" <sip:paul@domain2.com>  ~ 706

Privacy:

P-Access-Network-Info:

From: Paul <sip:Paul.Smith@domain2.com>;tag=ty20s  ~ 706

To: John <sip:John.Doe@domain.com>  ~ 708

Call-ID: [

CSeq: .. INVITE

Require:

Proxy-Require:

Supported:

Security-Verify:

Contact: <sip:[1080::8:800:200C:417A]:5059;comp=sigcomp>

Allow:

Content-Type:

Content-Length:

```
INVITE sip:John.Doe@domain.com SIP/2.0  ⟵ 702
Via: SIP/2.0/UDP [1080::8:800:200C:417A]:5059;comp=sigcomp;branch=z9hG4b543fg]
Max-Forwards: [Omitted. Not relevant to invention.]
Route: <sip:pcscf1.visitedmarket.net:5058;lr;comp=sigcomp>,
                                                              ⟵ 1102
       <sip:application-server@visitedmarket.net;lr>
                                                ⟵ 1104
P-Preferred-Identity: "Paul Smith" <sip:paul@domain2.com>
Privacy:
P-Access-Network-Info:
From: Paul <sip:Paul.Smith@visiteddomain.com>;tag=ty20s
To: John <sip:John.Doe@domain.com>  ⟵ 708
Call-ID:
CSeq:  INVITE
Require:
Proxy-Require:
Supported:
Security-Verify:
Contact: <sip:[1080::8:800:200C:417A]:5059;comp=sigcomp>
Allow:
Content-Type:
Content-Length:
```

FIG. 11

INVITE sip:John.Doe&domain.com@pttserver.visitedmarket.net SIP/2.0 ~1202
Via: SIP/2.0/UDP [1080::8:800:200C:417A]:5059;comp=sigcomp;branch=z9hG4b543fg]
Max-Forwards:
Route: <sip:pcscf1.visitedmarket.net:5058;lr;comp=sigcomp>, ⎫
      <sip:orig@scscf1.domain2.com;lr> ⎬ 704
P-Preferred-Identity: "Paul Smith" <sip:paul@domain2.com> ⎭
Privacy:
P-Access-Network-Info:
From: Paul <sip:Paul.Smith@domain2.com>;tag=ty20s ~706
To: John <sip:John.Doe&domain.com@pttserver.visitedmarket.net> ~1204
Call-ID:
CSeq: INVITE
Require:
Proxy-Require:
Supported:
Security-Verify:
Contact: <sip:[1080::8:800:200C:417A]:5059;comp=sigcomp>
Allow:
Content-Type:
Content-Length:

… # METHOD AND APPARATUS FOR SELECTIVELY REDIRECTING SESSION CONTROL FOR AN INTERNET PROTOCOL MULTIMEDIA SUBSYSTEM

FIELD OF THE INVENTION

The present invention relates generally to telecommunication systems. More specifically, but without limitation thereto, the present invention relates to a method and apparatus for passing session control for a mobile station (MS) to an application server in an Internet Protocol Multimedia Subsystems (IMS) environment.

BACKGROUND OF THE INVENTION

In a typical Internet Protocol multimedia subsystem (IMS) 3GPP/3GPP2 (third generation General Partnership Project) radio communication system, a Mobile Station (MS) sends a session initiation protocol (SIP) INVITE message to request that SIP session control be passed from a Serving Call Session Control Function (S-CSCF) to an application server (AS) to provide services to the Mobile Station. Previous methods used in Internet Protocol multimedia subsystems (IMS) require that the INVITE message be routed from the proxy server to the home server (I/S-CSCF) of the Mobile Station and then forwarded to the application server (AS).

DESCRIPTION OF THE SEVERAL VIEWS OF THE DRAWINGS

The following drawings are presented by way of example and not limitation, wherein like references indicate similar elements throughout the several views of the drawings, and wherein:

FIG. 7 illustrates an abstract of a typical session initiation protocol invite (SIP INVITE) message according to the prior art;

FIG. 8 illustrates an abstract of the session initiation protocol invite (SIP INVITE) message of FIG. 7 modified to include an additional header field;

FIG. 9 illustrates an abstract of the session initiation protocol invite (SIP INVITE) message of FIG. 7 in which the SERVICE ROUTE VECTOR is modified to replace the home server by a local application server;

FIG. 10 illustrates an abstract of the session initiation protocol invite (SIP INVITE) message of FIG. 7 modified to omit the SERVICE ROUTE VECTOR in the session initiation protocol invite (SIP INVITE) message to invoke a default service route;

FIG. 11 illustrates an abstract of the session initiation protocol invite (SIP INVITE) message of FIG. 7 modified to include an identifier for the user equipment that is borrowed from the visited market;

FIG. 12 illustrates an abstract of the session initiation protocol invite (SIP INVITE) message of FIG. 7 modified to alter the uniform resource identifier (URI) that specifies the target to map into a public service identity in the visited market.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that are useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific order; however, practitioners of the art will understand that the specific order depicted is not a requirement. Also, the terms and expressions used in the description have the ordinary meanings accorded to such terms and expressions in the corresponding respective areas of inquiry and study except where other meanings have been specifically set forth herein.

Pursuant to the following teachings, an extension of the 3GPP/3GPP2 IMS standard described below leverages many of the advantages of an Internet Protocol Multimedia Subsystem (IMS) environment and provides the option of breaking out of the service route between a Mobile Station (MS) and the home server. Instead of routing an INVITE message to an application server in the home market or in the visited market from the Mobile Station via the normal service route that includes the proxy server and the home server, the INVITE message is routed directly to the application server from the proxy server. By "breaking out" of the normal service route to the home server, the signaling and transport delays incurred by relaying the INVITE message through the home server may be advantageously avoided.

Prior to describing various embodiments for selectively redirecting Internet Protocol Multimedia Subsystem (IMS) session control, certain relevant aspects of previous telecommunication systems are briefly described.

Figure 1:
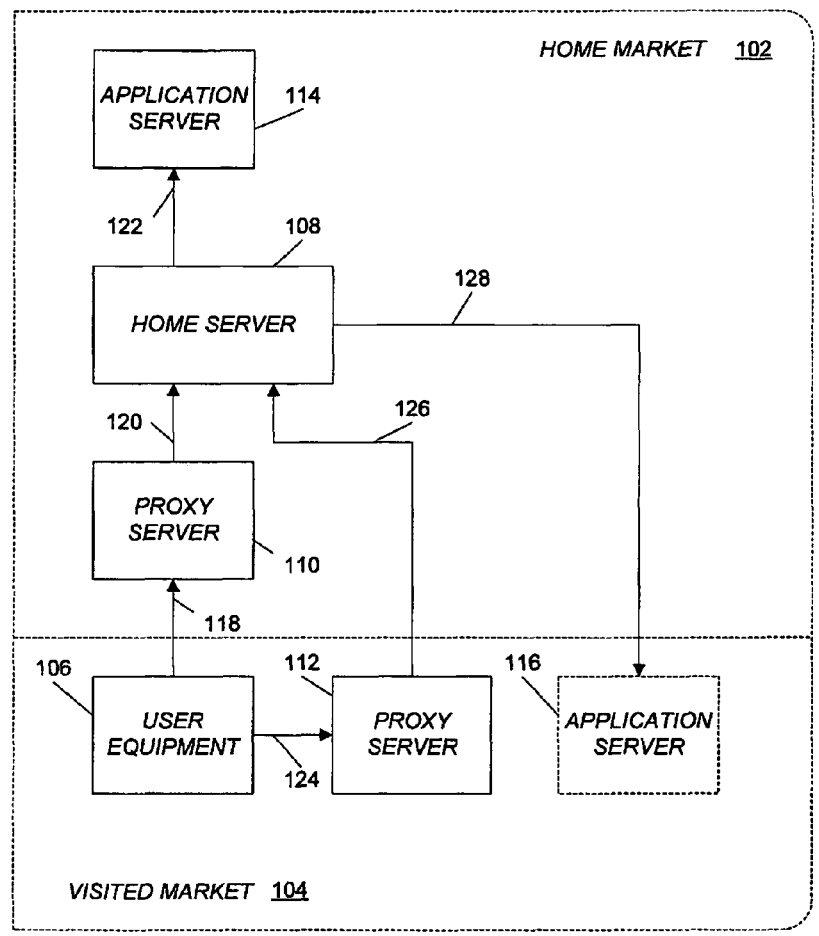
FIG. 1 illustrates a diagram of a portion of a typical telecommunication system of the prior art.

FIG. 1 illustrates a diagram of a portion of a typical telecommunication system 100 of the prior art. Shown in FIG. 1 are a home market 102, a visited market 104, user equipment 106, a home server 108, proxy servers 110 and 112, application servers 114 and 116, and service requests 118, 120, 122, 124, 126 and 128.

In FIG. 1, the user equipment 106 may be, for example, a Mobile Station (MS) such as a mobile handset, a desktop computer, or any communication device used to send and/or receive messages in the telecommunication system 100 that is compatible with the standard for an Internet Protocol Multimedia Subsystem (IMS). To simplify the description of the illustrated embodiments, the terms "user equipment" and "Mobile Station" are used interchangeably. The home server 108 is typically a serving call session control function (S-CSCF) in the home market 102. The term "market" denotes a collection of transmitter devices such as radio transmission towers within a defined geographic region that are associated with a specific server inside the market. For example, the home market 102 includes the home server 108 associated with the user equipment 106, and the visited market 104 may be any market outside the geographic region of the home market 102 that includes the proxy server 112. The home market 102 typically includes the home market proxy server 110 and the application server 114, and the visited market 104 typically includes the proxy server 112 and may also include the application server 116.

Transmitter devices and networks in the home market 102 and in the visited market 104 relay service requests and other messages between the user equipment 106, the proxy servers 110 and 112, the home server 108, and the application servers 114 and 116. The proxy servers 110 and 112 may be, for example, proxy call session control functions (P-CSCF) in an IMS environment. When the proxy server 110 in the home market 102 receives the service request 118 from the user equipment 106, the proxy server 110 forwards the request to the home server 108 via the service request 120. When the proxy server 112 in the visited market 104 receives the service request 124 from the user equipment 106, the proxy server 112 forwards the request to the home server 108 via the service request 126. The home server 108 forwards the request to the application server 114 in the home market 102 via the service request 122 or to the application server 116 in the visited market 104 via the service request 128.

The application servers 114 and 116 may be, for example, push-to-talk over cellular (PoC) servers that provide push-to-talk service. In general, the user equipment 106 does not determine which of the application servers 114 and 116 would be used to process the service request 118 or 124. For example, when the user equipment 106 detects that it has roamed from the home market 102 into the visited market 104 and recognizes the existence of the local application server 116 in the visited market 104, an explicit service request made by the user equipment 106 for processing by the local application server 116 in the visited market 104 is still routed as the service request 126 to the home server 108 when the user equipment 106 transmits the explicit service request 124 to the proxy server 112. The service requests 118 and 124 are typically included, for example, in a session initiation protocol invite (SIP) invite (INVITE) message.

The proxy servers 110 and 112 are generally configured to honor only service requests in which the service route includes the home server 108 of the user equipment 106, so that all messages between the user equipment 106 and the application servers 114 and 116, including the service requests 118 and 124, must be routed to the home server 108. The home server 108 then routes the explicit service request 128 to the application server 116 in the visited market 104 as shown in FIG. 1. Alternatively, the explicit service request 128 may be routed from the home server 108 to the application server 116 via the proxy server 112. The service request includes the service route, which is a set of instructions that specify how to route the service request. The service route may be inserted in the service request and used, for example, by proxy servers, to route the service request through the telecommunication system 100. Service route information is normally obtained by the user equipment when it registers in its home market or in a visited market.

While the arrangement of FIG. 1 performs satisfactorily for some applications, a problem arises for certain applications such as push-to-talk over cellular (PoC). For example, when mobile stations associated with a home server in California are roaming in Paris, France, the delay that results from routing service requests for real-time applications between them through the home server in California may be unacceptable. An example of such a real-time application is push-to-talk over cellular (PoC) service. For these applications, it would be advantageous to route service requests from the mobile stations through a server in the visited market, bypassing the home server.

To avoid the delay resulting from the arrangement of FIG. 1, it may be advantageous to break out of the initial service route that includes the home server 108 and to obtain a direct service route that bypasses the home server 108 when the user equipment 106 roams in the visited market 104 and to return to the initial service route when the user equipment 106 returns to the home market 102. Breaking out of the initial service route in the context used herein means establishing a direct service route from the user equipment 106 to the application server 114 or 116 that bypasses, that is, excludes, the home server 108. A breakout service request is a message or information included in a message for replacing the initial service route with the direct service route.

In one embodiment, a user equipment for a telecommunication system includes:

means for transmitting a breakout request from the user equipment to a proxy server to break out of an initial service route that includes a home server and to provide a direct service route for the user equipment that bypasses the home server; and means for communicating between the user equipment and the proxy server via the direct service route.

Figure 2:
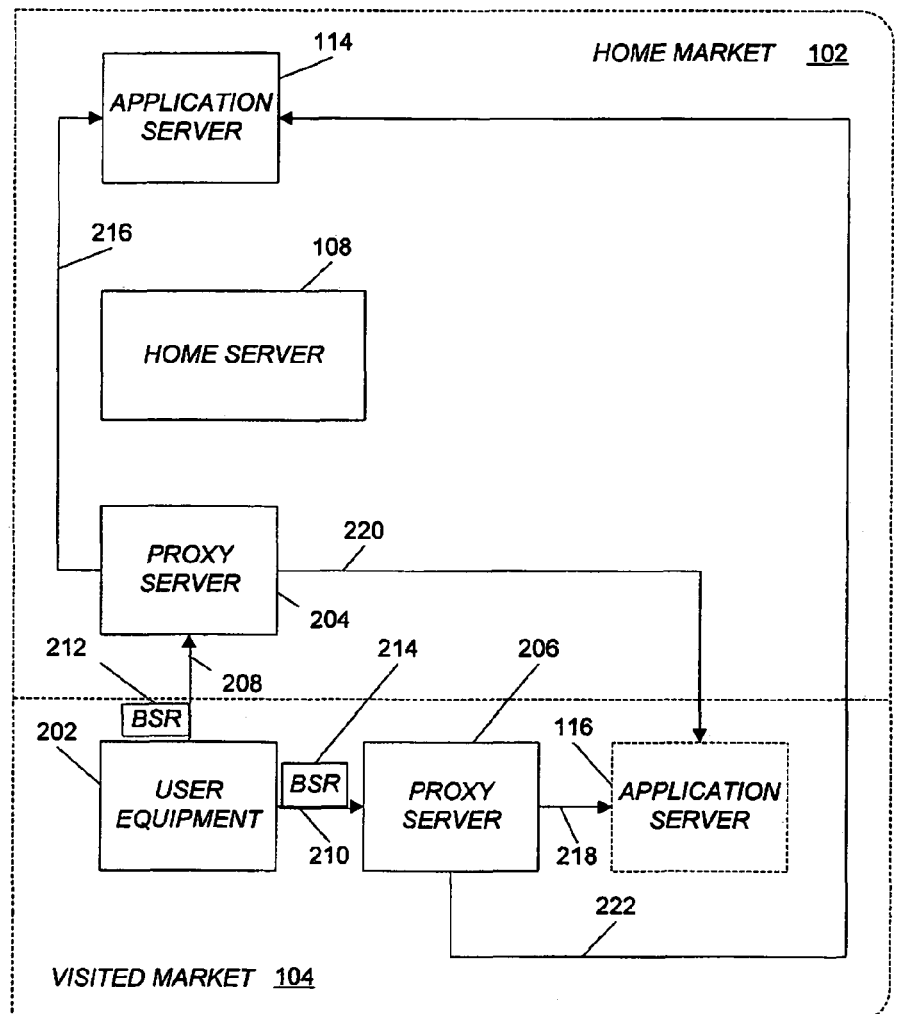
FIG. 2 illustrates a diagram of a portion of a telecommunication system that provides the option of breaking out of the normal service route in FIG. 1.

FIG. 2 illustrates a diagram of a portion of a telecommunication system 200 that provides the option of breaking out of the normal service route in FIG. 1. Shown in FIG. 2 are a home market 102, a visited market 104, a home server 108, application servers 114 and 116, user equipment 202, proxy servers 204 and 206, a modified session initiation protocol invite (SIP INVITE) messages 208 and 210, breakout service requests (BSR) 212 and 214, and service requests 216, 218, 220 and 222.

In FIG. 2, the user equipment 202 is identical to the user equipment 106 in FIG. 1 with an additional capability of transmitting the breakout service requests 212 and 214. The breakout service request 212 is a request by the user equipment 202 for a direct service route to the application server 114 or to the application server 116 that bypasses the home server 108. The breakout service request 214 is a request by the user equipment 202 for a direct service route to the application server 114 or to the application server 116 that bypasses the home server 108. The breakout service requests 212 and 214 may be included, for example, in the session initiation protocol invite (SIP INVITE) messages 208 and 210 as illustrated in the example of FIG. 2. In other embodiments, the breakout service requests 212 and 214 may be included in session initiation protocol (SIP) registration (REGISTER) messages.

The proxy servers 204 and 206 may be identical to the proxy servers 110 and 112 of FIG. 1, including an additional capability of detecting the breakout requests 212 and 214 for embodiments in which the breakout request is not transparent to the proxy server; that is, when the proxy server performs an added function for establishing a direct service route to an application server that bypasses the home server 108.

When the proxy server 204 or 206 receives the message 208 or 210, the proxy server 204 or 206 recognizes when a local service is being requested so that the message 208 or 210 may be forwarded to the application server 114 or 116 via the service request 216, 218, 220 or 222. In other embodiments in which the breakout service requests 212 and 214 are transparent to the proxy servers 204 and 206, the proxy servers 204 and 206 may be identical to the proxy servers 110 and 112 in FIG. 1. In the example of FIG. 2, the breakout service requests 212 and 214 are included in the modified SIP INVITE messages 208 and 210; however, the breakout service requests 212 and 214 may also be communicated in other messages to practice various embodiments within the scope of the appended claims.

When the user equipment 202 roams in the visited market 104, for example, when a Mobile Station based in the home market 102 in California roams in the visited market 104 in Paris, France, it may be desirable to register the user equipment 202 with the application server 116 in the visited market 104 instead of with the application server 114 in the home market 102. In the arrangement of FIG. 1, the proxy server 110 may route to Public Service Identities (PSI) (not shown) in the visited market 104; however, the Uniform Resource Identifier (URI) for a SIP INVITE message identifies a group or an application server, and there is no mechanism to invite an individual to participate in a local service such as a dispatch call provided by a local application server such as the application server 116 in the visited market 104, because such a mechanism is considered impractical for Domain Name Server (DNS) scaling. Consequently, Public Service Identities may be used to invite globally unique identifiers configured by the market operator to participate in a local service session, but not individuals.

The Service Route session initiation protocol extension may be used, upon registration, to allow the home server 108 to inform the proxy server 206 in the visited market 104 of the service route for subsequent SIP INVITE messages. The service route is specified in a Service Route Vector. The Service Route Vector is a series of Uniform Resource Identifiers (URI) that must be traversed for subsequent signaling attempts made by the user equipment 106. However, current Service Route syntax in the Internet Protocol for Multimedia Subsystems (IMS) does not allow more than one Service Route Vector to be specified. Consequently, it is not feasible to have a Service Route Vector to the home server and a separate Service Route Vector for to an application server in the visited market 104, because the proxy server 206 associates only one Service Route Vector per user equipment 106. The service breakout request 214 described above may be used advantageously to request a Service Route Vector to the application server 116 in the visited market 104 that bypasses the home server 108. For example, the Service Route Vector to the application server 116 may include a route field, also called a route element, a route parameter, or a route entry, that includes the address, that is, the Uniform Resource Identifier (URI), of the application server 116.

FIGS. 3-6 illustrate examples of signaling paths that may be established using the breakout request option of FIG. 2 between originating and terminating parties. The originating user equipment may be, for example, identical to the user equipment 202 of FIG. 2. The terms "originating" and "terminating" are not intended to imply a specific market in which the user equipment or the terminating user equipment may be located, rather the role of the user equipment and the terminating user equipment in the session initiation protocol (SIP) session. More specifically, the originating user equipment invites the terminating user equipment (or, in other embodiments, an application server) to a session. Accordingly, either or both of the originating user equipment and the terminating user equipment may be in either the home market or the visited market. In embodiments where the terminating party is a single target or destination, the terminating user equipment may be, for example, identical to the originating user equipment 202 of FIG. 2.

Figure 3:
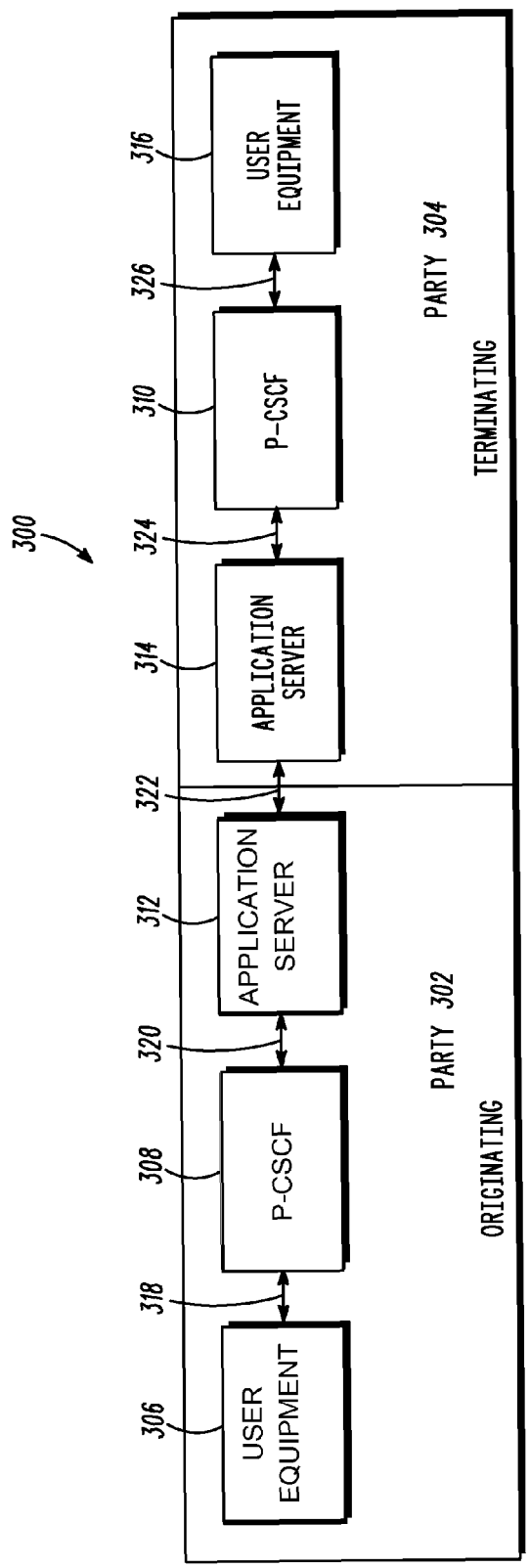
FIG. 3 illustrates a diagram of a signaling path using the breakout request option of FIG. 2 including a separate proxy server for each of the originating party and the terminating party and a separate application server for each of the originating party and the terminating party.

FIG. 3 illustrates a diagram of a signaling path 300 using the breakout request option of FIG. 2 including a separate proxy server for each of the originating party and the terminating party and a separate application server for each of the originating party and the terminating party. Shown in FIG. 3 are an originating party 302, a terminating party 304, originating user equipment 306, proxy servers 308 and 310, application servers 312 and 314, terminating user equipment 316, and path increments 318, 320, 322, 324 and 326.

In FIG. 3, messages are communicated between the originating party 302 represented by the originating user equipment 306 and the terminating party 304 represented by the terminating user equipment 316. In the example of FIG. 3, messages between the originating party 302 and the terminating party 304 are communicated over the path increment 318 from the originating user equipment 306 to the proxy server 308, over the path increment 320 from the proxy server 308 to the application server 312, over the path increment 322 from the application server 312 to the application server 314, over the path increment 324 from the application server 314 to the proxy server 310, and over the path increment 326 from the proxy server 310 to the terminating user equipment 316. The path from the originating user equipment 306 to the terminating user equipment 316 is reversed to communicate in the opposite direction. The arrangement of FIG. 3 contrasts with the prior art, where a home server for the user equipment 306 would be required between the proxy server 308 and the application server 312, and another home server would be required for the user equipment 316 between the application server 314 and the proxy server 310. In some embodiments, the home server between the application server 314 and the proxy server 310 may be included in the service route between the user equipment 306 and the user equipment 316, bypassing the home server of the user equipment 306.

Figure 4:
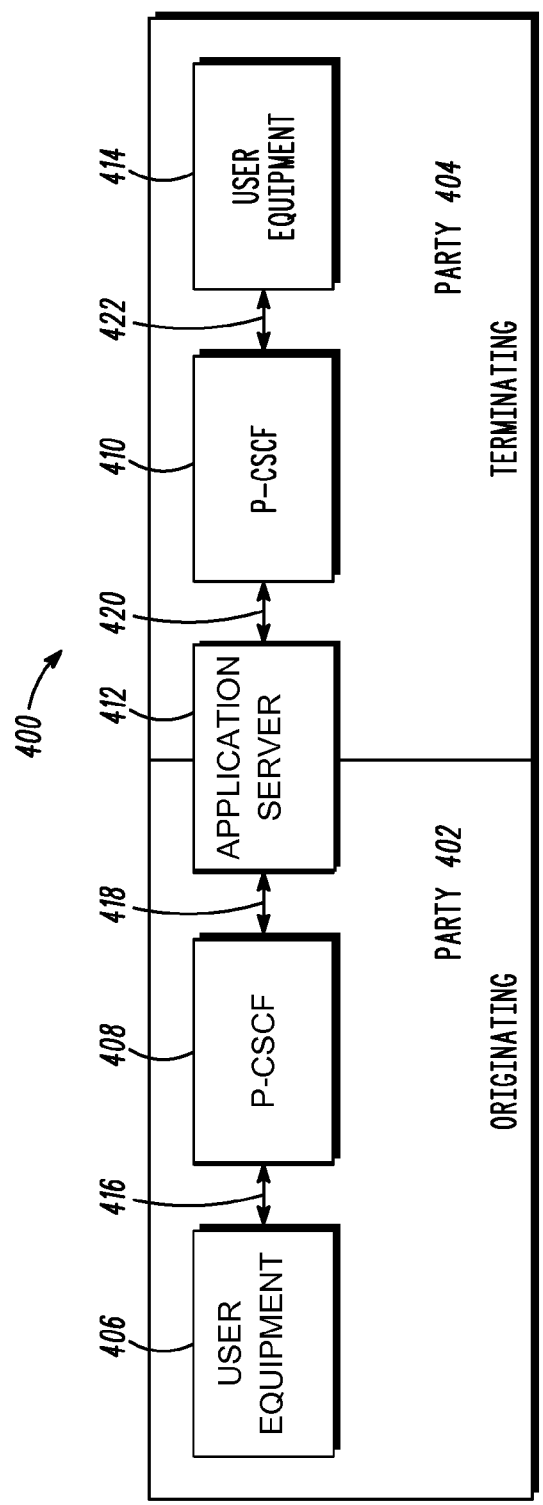
FIG. 4 illustrates a diagram of a signaling path using the breakout request option of FIG. 2 including a separate proxy server for each of the originating party and the terminating party and a shared application server.

FIG. 4 illustrates a diagram of a signaling path 400 using the breakout request option of FIG. 2 including a separate proxy server for each of the originating party and the terminating party and a shared application server. Shown in FIG. 4 are an originating party 402, a terminating party 404, originating user equipment 406, proxy servers 408 and 410, a shared application server 412, terminating user equipment 414, and path increments 416, 418, 420 and 422.

In FIG. 4, messages are communicated between the originating party 402 represented by the originating user equipment 406 and the terminating party 404 represented by the terminating user equipment 414. The shared application server 412 is shown partially in the originating party 402 and partially in the terminating party 404 to indicate that the shared application server 412 is common to both the originating party 402 and the terminating party 404.

In the example of FIG. 4, messages between the originating party 402 and the terminating party 404 are communicated over the path increment 416 from the originating user equipment 406 to the proxy server 408, over the path increment 418 from the proxy server 408 to the application server 412, over the path increment 420 from the application server 412 to the proxy server 410, and over the path increment 422 from the proxy server 410 to the terminating user equipment 414. The path from the originating user equipment 406 to the terminating user equipment 414 is reversed to communicate in the opposite direction.

Figure 5:
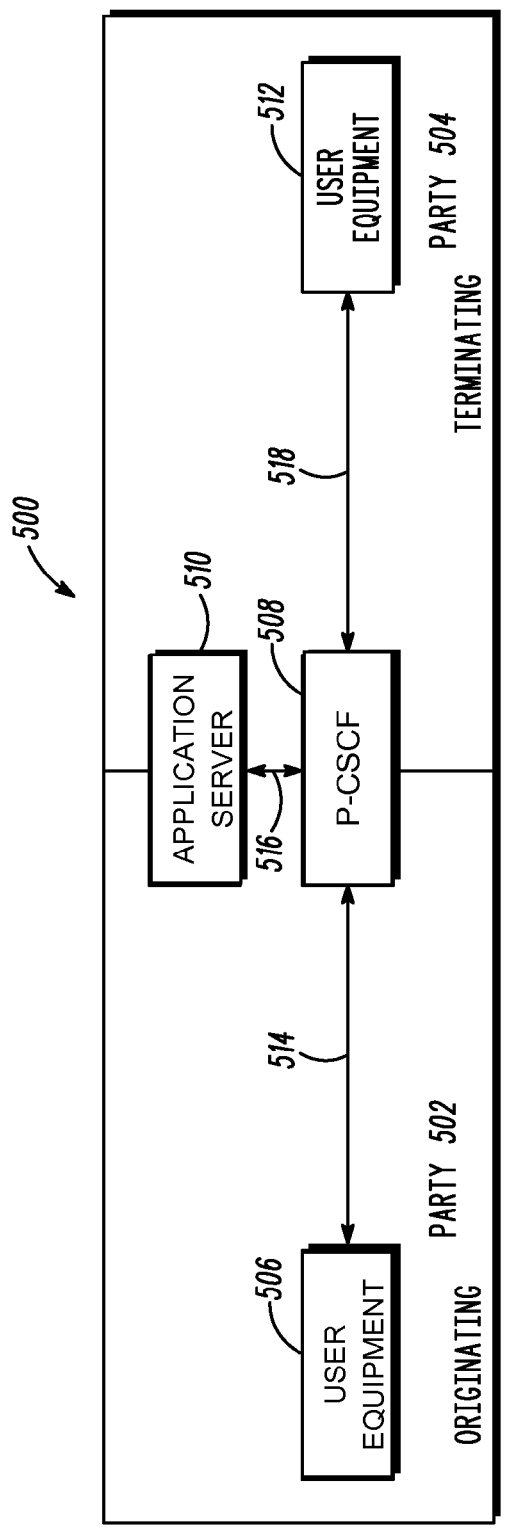
FIG. 5 illustrates a diagram of a signaling path using the breakout request option of FIG. 2 including a shared proxy server and a shared application server.

FIG. 5 illustrates a diagram of a signaling path 500 using the breakout request option of FIG. 2 including a shared proxy server and a shared application server. Shown in FIG. 5 are an originating party 502, a terminating party 504, originating user equipment 506, a shared proxy server 508, a shared application server 510, terminating user equipment 512, and path increments 514, 516, and 518.

In FIG. 5, messages are communicated between the originating party 502 represented by the originating user equipment 506 and the terminating party 504 represented by the terminating user equipment 512. The shared proxy server 508 and the shared application server 510 are shown partially in the originating party 502 and partially in the terminating party 504 to indicate that the shared proxy server 508 and the shared application server 510 are common to both the originating party 502 and the terminating party 504.

In the example of FIG. 5, messages between the originating party 502 and the terminating party 504 are communicated over the path increment 514 from the originating user equipment 506 to the proxy server 508, over the path increment 516 from the proxy server 508 to the application server 510, over the path increment 516 from the application server 510 to the proxy server 508, and over the path increment 518 from the proxy server 508 to the terminating user equipment 512. The path from the originating user equipment 506 to the terminating user equipment 512 is reversed to communicate in the opposite direction. This arrangement for message routing may be appropriate in cases where both of the user equipment 506 and 512 are in the same visited market.

Figure 6:
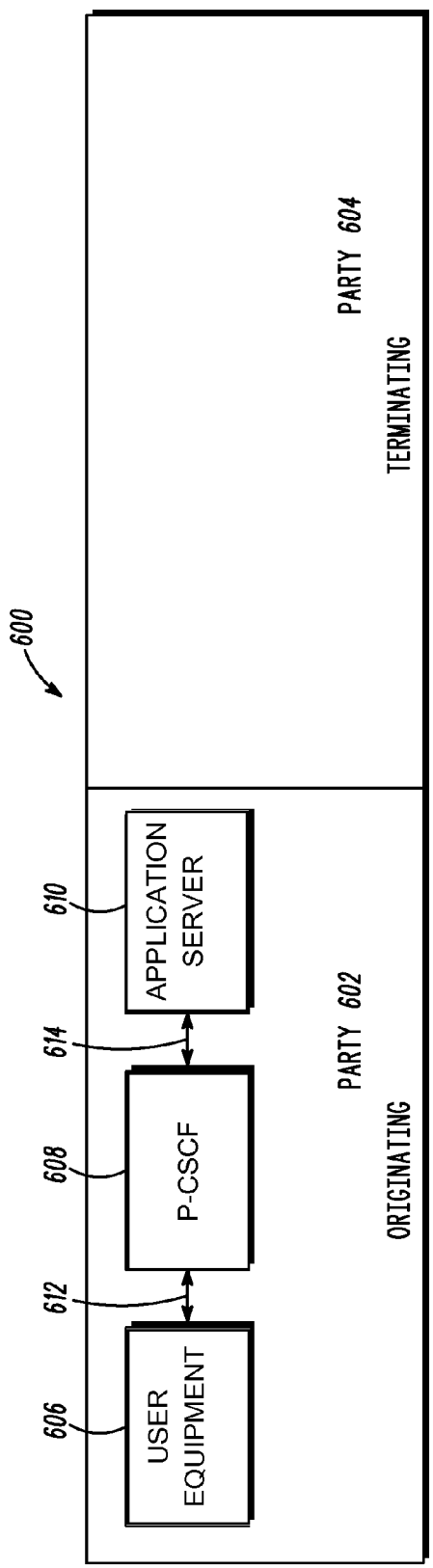
FIG. 6 illustrates a diagram of a signaling path using the breakout request option of FIG. 2 in which the terminating party is an application server.

FIG. 6 illustrates a diagram of a signaling path 600 using the breakout request option of FIG. 2 in which the terminating party is an application server. Shown in FIG. 6 are an originating party 602, a terminating party 604, originating user equipment 606, a proxy server 608, an application server 610, and path increments 612 and 614.

In FIG. 6, messages are communicated between the originating party 602 represented by the originating user equipment 606 and application server 610. The terminating party 604 is shown empty to indicate that the application server 610 is used for a purpose other than communicating with user equipment. For example, the application server 610 may be a database for maps and driving directions.

In the example of FIG. 6, messages are communicated over the path increment 612 from the originating user equipment 606 to the proxy server 608 and over the path increment 614 from the proxy server 608 to the application server 610. The path from the originating user equipment 606 to the application server 610 is reversed to communicate in the opposite direction.

FIG. 7 illustrates an abstract of a typical session initiation protocol invite (SIP INVITE) message 700 according to the prior art. Shown in FIG. 7 are an INVITE field 702, a ROUTE header 704, a FROM field 706, and a TO field 708.

In FIG. 7, the INVITE field 702 contains the uniform resource identifier (URI) of the party being invited to an SIP session and the type of session. The ROUTE header 704 is inserted in the SIP INVITE message 700 by the calling party user equipment 202 in FIG. 2 and includes the path to the home server 108 from the user equipment 202. The FROM field contains the uniform resource identifier (URI) of the calling party 202, and the TO field 708 contains the uniform resource identifier (URI) of the party being invited to the SIP session, for example, the application server 116. Other fields not shown or abbreviated in the abstract of the SIP INVITE message 700 may be used by the telecommunications system to establish an SIP session between the calling party and the party invited to the SIP session.

FIG. 8 illustrates an abstract of the session initiation protocol invite (SIP INVITE) message of FIG. 7 modified to include an additional header field. Shown in FIG. 8 are an INVITE field 702, a ROUTE header 704, a FROM field 706, a TO field 708, and an additional header field 802.

In FIG. 8, the additional header field 802 provides the Uniform Resource Identifier (URI) of the application server 114 or 116 in the session initiation protocol invite (SIP INVITE) message 208 or 210 to the proxy server 204 or 206 in FIG. 2. The additional header field 802 contains a breakout route to the local application server 114 or 116 that indicates to the proxy server 204 or 206 that the user equipment 202 is requesting a breakout from the normal service route via the home server 108. When the proxy server 204 or 206 detects the additional header field 802, the proxy server 204 or 206 suspends the requirement that the service route must include the home server 108 and provides a direct service route to the application server 114 or 116 that bypasses the home server 108. The proxy server 204 or 206 then forwards the session initiation protocol invite (SIP INVITE) message 208 or 210 to the application server 114 or 116 via the service request 216 or 218.

FIG. 9 illustrates an abstract of the session initiation protocol invite (SIP INVITE) message of FIG. 7 in which the ROUTE header is modified to replace the home server by a local application server. Shown in FIG. 9 are an INVITE field 702, a FROM field 706, a TO field 708, and a ROUTE header 902.

In FIG. 9, the ROUTE header 902 designates the proxy server 204 or 206 as the first server in the service route in the same manner of FIG. 7 for a roaming mobile station. However, the Uniform Resource Identifier (URI) of the application server 114 or 116 is inserted in the ROUTE header 902 of the SIP INVITE message 208 or 210, replacing the Uniform Resource Identifier (URI) of the home server 108 used for the initial service route in the ROUTE header 704 of FIG. 7. When the proxy server 204 or 206 detects that the home server 108 has been replaced in the ROUTE header 902, the proxy server 204 or 206 suspends the requirement that the service route must include the home server 108 and provides a direct service route to the local application server 114 or 116 according to the ROUTE header 902, bypassing the home server 108.

FIG. 10 illustrates an abstract of the session initiation protocol invite (SIP INVITE) message of FIG. 7 modified to omit the ROUTE header 704 in the session initiation protocol invite (SIP INVITE) message to invoke a pre-configured default service route. Shown in FIG. 10 are an INVITE field 702, a FROM field 706, and a TO field 708.

In FIG. 10, the service route vector information beyond the proxy server 204 or 206 in FIG. 2 is omitted from the ROUTE header 704 of FIG. 7 in the session initiation protocol invite (SIP INVITE) message 208 or 210 to indicate the breakout request 212 or 214. When the proxy server 204 or 206 detects the absence of the service route information beyond the proxy server 204 or 206 in the session initiation protocol invite (SIP INVITE) message 208 or 210, the proxy server 204 or 206 suspends the requirement that the service route must include the home server 108. Alternatively, the entire ROUTE header 704 of FIG. 7 including the service route information beyond the proxy server 204 or 206 may be omitted from the session initiation protocol invite (SIP INVITE) message 208 or 210 in FIG. 2 to indicate the breakout request 212 or 214.

The proxy server 204 or 206 detects the breakout request 212 or 214 from the absence of the service route information beyond the proxy server 204 or 206 and invokes a default service route that was previously configured in the proxy server. The default service route may be uploaded to the proxy server 204 or 206, for example, from an Operation and Maintenance Center (OMC). The default service route may be identical to the service route in the ROUTE header 902 in FIG. 9, resulting in a signal path that bypasses the home server 108. In the example of FIG. 10, the breakout request is initiated by the absence of the service route information beyond the proxy server 204 or 206, and the service route that includes the Uniform Resource Identifier of the application server 114 or 116 is pre-configured in the proxy server 204 or 206.

FIG. 11 illustrates an abstract of the session initiation protocol invite (SIP INVITE) message of FIG. 7 modified to include an identifier for the user equipment that is borrowed from the visited market. Shown in FIG. 11 are an INVITE field 702, a TO field 708, a ROUTE header 1102, and a FROM field 1104.

In the embodiment of FIG. 11, the user equipment 202 in FIG. 2 includes the capability of breaking out of the normal service route in a manner that is transparent to the proxy server 204 or 206. To break out of the normal service route, the user equipment 202 transmits a first session initiation protocol register (SIP REGISTER) message 208 or 210 to the proxy server 204 or 206 using the standard FROM field 706 in FIG. 7 containing the URI for the user equipment 202 to register the user equipment 202. The user equipment 202 then borrows an identifier, for example, from the application server 114 or 116, or from another server such as a DHCP server (not shown), a security server such as a RADIX server (not shown), or a local S-CSCF server (not shown) in the visited market 104. The Uniform Resource Identifier (URI) of the user equipment 202 in the FROM field 1104 of FIG. 11 is replaced by the borrowed identifier, associating the user equipment 202 with the domain that includes the application server 114 or 116. The borrowed identifier may also associate the user equipment 202 with a dispatch application server, for example, the serving Dispatch Application Processor (DAP). The user equipment 202 then transmits a second session initiation protocol register (SIP REGISTER) message 208 or 210 using the borrowed identifier to obtain the local service route information for a direct service route to the local application server 116. The direct service route may or may not pass through a local serving call service control function (S-CSCF) (not shown). The user equipment 202 replaces the ROUTE header 704 of FIG. 7 with the ROUTE header 1102 and replaces the Uniform Resource Identifier (URI) of the user equipment 202 in the FROM field 704 with the borrowed identifier to generate the FROM field 1104 in the SIP INVITE message of FIG. 11.

The proxy server 204 or 206 in FIG. 2 processes the session initiation protocol invite (SIP INVITE) message of FIG. 11 with the modified FROM field 1104 as though the user equipment 202 were a local subscriber and forwards the message to the application server 114 or 116, for example, via the local S-CSCF server (not shown). In this arrangement, no modification of the proxy server 204 or 206 is required to break out of the normal service route. Additional identifiers may be borrowed in the same manner as the borrowed identifier in the FROM field 1104 to create ROUTE headers in the visited market 104 that bypass the home server 108. These ROUTE headers may be used to communicate with the application servers in the visited market 104. Consequently, the second session initiation protocol register (SIP REGISTER) message becomes a breakout request that allows the user equipment 202 to use the borrowed identifier and the created ROUTE header as a breakout request in a subsequent SIP INVITE message.

FIG. 12 illustrates an abstract of the session initiation protocol invite (SIP INVITE) message of FIG. 7 modified to alter the uniform resource identifier (URI) that specifies the target to map into a public service identity in the visited market. Shown in FIG. 12 are a ROUTE header 704, a FROM field 706, an INVITE field 1202, and a TO field 1204.

In FIG. 12, the user equipment 202 in FIG. 2 also includes the capability of breaking out of the normal service route in a manner that is transparent to the proxy server 110 or 112. In the arrangement of FIG. 12, the user equipment 202 mangles the uniform resource identifier (URI) that specifies the target in the modified session initiation protocol invite (SIP INVITE) message. For example, the user equipment 202 can mangle the original target uniform resource identifier (URI) in the INVITE field 702 of FIG. 7, john.doe@domain.com, with the Uniform Resource Identifier (URI) of a public service identity (PSI), pttserver.visitedmarket.net, to generate the mangled uniform resource identifier (URI), john.doe&domain.com@pttserver.visitedmarket.net, where the public service identity (PSI) maps into the application server 114 or 116.

The user equipment 202 may insert the mangled uniform resource identifier (URI) in the request URI of the SIP INVITE message 1202 or in the "TO" header 1204.

In another embodiment, the user equipment 202 may use the address of the local application server 114 or 116 in the request URI of the SIP INVITE message and insert the target URI in the "TO" header 1204 of the SIP INVITE message or elsewhere in the body of the SIP INVITE message. The proxy server 110 or 112 may be pre-configured according to well-known techniques to recognize the replaced or mangled uniform resource identifier (URI) as a breakout request or as a public service identity (PSI) and to route the session initiation protocol (SIP) message to the local public application server 114 or 116. The local public application server 114 or 116 can de-mangle the mangled Uniform Resource Identifier (URI) to extract the original target uniform resource identifier (URI) and can process the session initiation protocol invite (SIP INVITE) message accordingly.

In some applications, such as push-to-talk (PTT), it is likely that a pre-configured service route would be used in the session initiation protocol invite (SIP INVITE) message that identifies one of the local push-to-talk (PTT) application servers. However, there may also be applications when the user equipment is not pre-configured with the identifiers for the local application servers that are available in the visited market. When a mobile station (MS) roams into a visited market, it is desirable to discover what local services are available to the roaming mobile station (MS) in the visited market in addition to the services available from the home server. The local services in the visited market may be discovered by querying the directory of local services in the visited domain before roaming, or the roaming user equipment can dynamically discover the local services in the visited market and the associated service route entries for each local service as follows.

The proxy server may add one or more session initiation protocol (SIP) extensions to the 200 OK REGISTER response that include the list of local services and their uniform resource identifiers (URI) before transmitting the 200 OK REGISTER response to the user equipment. The user equipment can then present the list of local services to the user.

Alternatively, the proxy server may include multiple service route vectors in the 200 OK REGISTER response that include the list of local services and their uniform resource identifiers (URI). Also, the user equipment can request the list of local services without the proxy server, since none of the typical services of the proxy server such as session initiation protocol (SIP), compression, and quality of service (QoS) are required for the discovery of local services. For example, the user equipment can use the name of the visited domain and query the local domain name system (DNS) server with a pre-defined string such as Configuration_Server@this_visited_domain If the server is found, the mobile station (MS) can query the server directly for local service information. Also, the local domain name system (DNS) server may provide the user equipment with the uniform resource identifier (URI) of a push-to-talk (PTT) application server in the visited domain.

Alternative dispatch protocol may identify a call target in a location other than the INVITE field 1202. For example, push-to-talk over cellular (PoC) does not use the first line of the INVITE message to identify the target. The request uniform resource identifier (URI) of a PoC INVITE message contains the conference-factory URI of the PoC server that supports the dispatch calls of the originating PoC user. The target is specified in the body of the INVITE message.

In another embodiment, a method includes steps of:
(a) providing a telecommunications system including a user equipment, a home server, a proxy, and an application server;
(b) transmitting a breakout request from the user equipment to a proxy server to break out of an initial service route that includes a home server and to provide a direct service route for the user equipment that bypasses the home server; and
(c) routing a subsequent communication between the user equipment and the application server through the proxy server via the direct service route.

Figure 13:
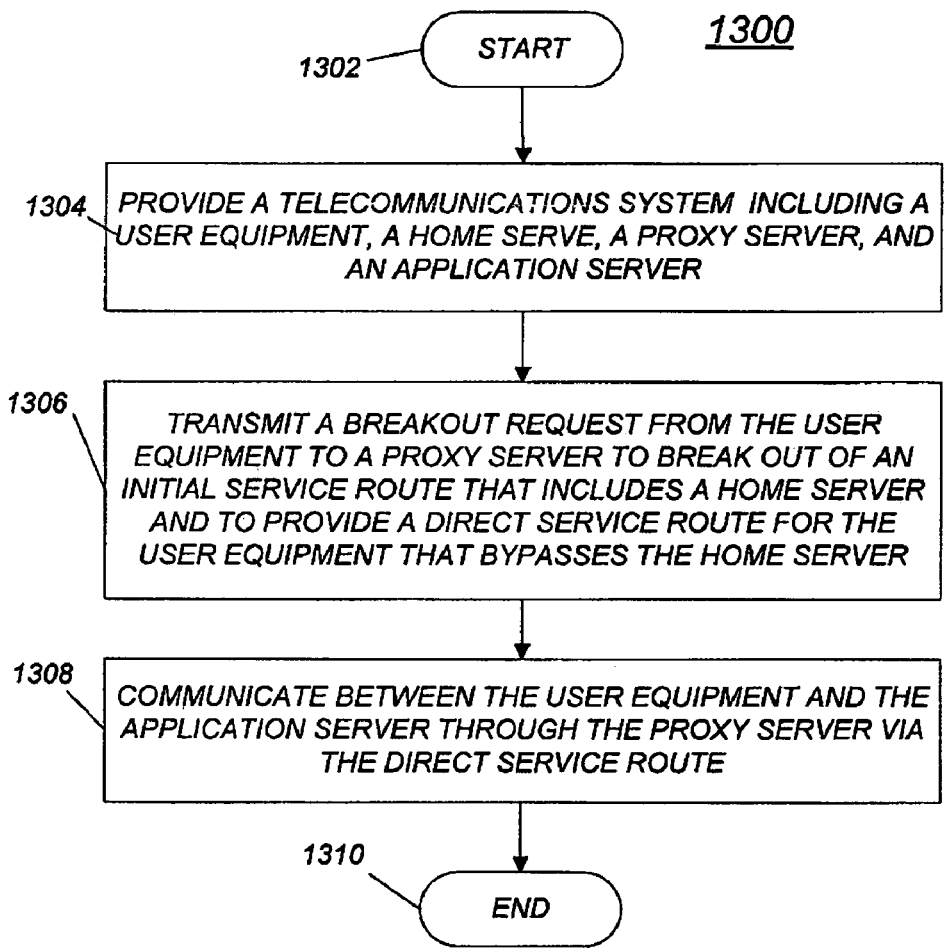
FIG. 13 illustrates a flow chart for a method of selectively redirecting session control for an internet protocol multimedia subsystem.

FIG. 13 illustrates a flow chart 1300 of an illustrative method of selectively redirecting session control for an internet protocol multimedia subsystem.

Step 1302 is the entry point of the flow chart 1300.

In step 1304, a telecommunications system is provided including a user equipment, a home server, a proxy server, and an application server according to well-known techniques.

In step 1306, a breakout request is transmitted from the user equipment to a proxy server to break out of an initial service route that includes a home server and to provide a direct service route for the user equipment that bypasses the home server. The breakout request may be, for example, a SIP INVITE message modified to include an additional header as described above with reference to FIG. 8, a SIP INVITE message modified to replace the home server in the route vector as described above with reference to FIG. 9, a SIP INVITE message modified to omit all route entries beyond the proxy server as illustrated in FIG. 10, an SIP INVITE message modified to replace a standard identifier with a borrowed identifier as described above with reference to FIG. 11, or an SIP INVITE message modified to map a target into a public service identity as described above with reference to FIG. 12.

In step 1308, subsequent communication between the user equipment and the application server is routed according to well-known techniques through the proxy server via the direct service route that bypasses the home server.

Step 1310 is the exit point of the flow chart 1300.

The method described above for selectively redirecting session control for an internet protocol multimedia subsystem may be applied selectively, that is, in the absence of a breakout request, normal Internet Protocol multimedia subsystems (IMS) routing methods continue to apply.

Although the flowchart description above is described and shown with reference to specific steps performed in a specific order, these steps may be combined, sub-divided, or reordered without departing from the scope of the claims. Unless specifically indicated, the order and grouping of steps is not a limitation of other embodiments that may lie within the scope of the claims.

The flow chart 1300 of FIG. 13 may also be implemented by instructions for being performed on a computer or other programmable or partially programmable platform. The instructions may be embodied in ROM, RAM, disk, CD-ROM, and other computer readable media according to well-known computer programming techniques.

In another embodiment, a computer program product includes a medium for embodying a computer program for input to a computer and a computer program embodied in the medium for causing the computer to perform steps of:
(a) providing a telecommunications system including a user equipment, a home server, a proxy server, and a local application server;
(b) transmitting a breakout request from the user equipment to a proxy server to break out of an initial service route that includes a home server and to provide a direct service route for the user equipment that bypasses the home server; and
(c) routing a subsequent communication between the user equipment and the application server through the proxy server via the service route.

In the example described above, the computer program is performed in the mobile station 202. Alternatively, the computer program may be performed by an application or included in standard (physical layer) CDMA-2000, HRPD, HRPDA, HRPDB, Universal Mobile Telecommunications System (UIMTS), enhanced UMTS, W-LAN (Wireless Local Area Network), and Wi-MAX (Worldwide interoperability for Microwave Access).

In another embodiment, the user equipment can dynamically discover local application servers in addition to the home server normally provided in Internet Protocol multimedia subsystems (IMS), for example, using the breakout methods described above or by querying the local application server directory directly. Alternatively, the system operator can provide a list of local application servers that are authorized to break out of the normal IMS signaling path.

As may be appreciated from the method of selectively redirecting session control for an internet protocol multimedia subsystem described above, a substantial reduction in communication delays may be achieved by breaking out of a service route that includes the home server of the user equipment when the user equipment roams in a visited market.

The specific embodiments and applications thereof described above are for illustrative purposes only and do not preclude modifications and variations that may be made within the scope of the following claims.

What is claimed is:
1. A method comprising steps of:
(a) providing a telecommunications system including a user equipment;
(b) the user equipment transmitting a breakout request to a proxy server, the breakout request requesting to break out of an initial service route that includes a Serving Call

Session Control Function (S-CSCF) associated with the user equipment in a home market of the user equipment and requesting a direct service route for the user equipment that bypasses the S-CSCF; and (c) the user equipment communicating with an an application server through the proxy server via the direct service route.

2. The method of claim 1 wherein the user equipment comprises one of a mobile handset, a desktop computer, and another communication device used to send or receive messages in the telecommunication system.

3. The method of claim 1 wherein step (b) comprises the user equipment transmitting a session initiation protocol invite message (SIP INVITE) to the proxy server.

4. The method of claim 3 wherein step (b) comprises including the breakout request in the session initiation protocol invite (SIP INVITE) message.

5. The method of claim 4 wherein step (b) comprises adding a header in the session initiation protocol invite (SIP INVITE) message that identifies the application server.

6. The method of claim 4 wherein step (b) comprises modifying a route entry in the session initiation protocol invite (SIP INVITE) message to replace a Uniform Resource Identifier (URI) of the S-CSCF with a URI of the application server.

7. The method of claim 4 wherein step (b) comprises omitting all route entries beyond the proxy server in the session initiation protocol invite (SIP INVITE) message to invoke a default service route that was previously configured in the proxy server and is associated with an identifier (ID) of the user equipment and the application server.

8. The method of claim 4 wherein step (b) comprises omitting all route entries in the session initiation protocol invite (SIP INVITE) message to invoke a default service route that was previously configured in the proxy server and is associated with an identifier (ID) of the user equipment and the application server.

9. The method of claim 3 wherein step (b) comprises mangling a uniform resource identifier (URI) in the session initiation protocol invite (SIP INVITE) message that specifies a target to map the target into the application server.

10. The method of claim 1 wherein step (b) comprises transmitting a session initiation protocol register (SIP REGISTER) message from the user equipment to the application server wherein the session initiation protocol register (SIP REGISTER) message includes a borrowed identifier.

11. The method of claim 1 further comprising performing step (b) when the user equipment roams in a visited market.

12. The method of claim 1 wherein the proxy server is a proxy call session control function (P-CSCF) in an Internet Protocol Multimedia Subsystem (IMS).

13. A user equipment for a telecommunications system comprising:

a transmitter; and a processor, communicatively coupled to the transmitter, adapted to transmit, via the transmitter, a breakout request to a proxy server, the breakout request requesting to break out of an initial service route that includes a Serving Call Session Control Function (S-CSCF) associated with the user equipment in a home market of the user equipment and requesting a direct service route for the user equipment that bypasses the S-CSCF.

14. The user equipment of claim 13 wherein the breakout request is included in a session initiation protocol invite (SIP INVITE) message.

15. The user equipment of claim 14 wherein the breakout request comprises a header in the session initiation protocol invite message that identifies the application server.

16. The user equipment of claim 15 wherein the breakout request comprises a service route vector in which a Uniform Resource Identifier (URI) of the S-CSCF is replaced by a URI of the application server.

17. The user equipment of claim 14 wherein the breakout request omits all route entries beyond the proxy server in the session initiation protocol invite message to invoke a default service route that was previously configured in the proxy server to provide a service route between the user equipment and the application server.

18. The user equipment of claim 13 wherein the breakout request includes a session initiation protocol register message from the user equipment to a local public server and wherein the session initiation protocol register message includes an identifier (ID) for the user equipment that is borrowed from the local public server.

19. The user equipment of claim 13 further comprising a uniform resource identifier (URI) of a target in the session initiation protocol invite (SIP INVITE) message that is mangled to map the target into the application server.

20. The user equipment of claim 13 wherein the user equipment comprises one of a mobile handset, a desktop computer, and another communication device used to send or receive messages in the telecommunication system.

21. A proxy call session control function (P-CSCF) in an Internet Protocol Multimedia Subsystem (IMS), the P-CSCF comprising means for recognizing a uniform resource identifier from a breakout request received by the P-CSCF from a user equipment, the breakout request requesting a direct service route that bypasses a Serving Call Session Control Function (S-CSCF) associated with the user equipment in a home market of the user equipment; and means for providing the direct service route from the user equipment to the application server in response to the breakout request.

22. The proxy server of claim 21 wherein the breakout request comprises a header in the session initiation protocol invite message that identifies the application server.

23. The proxy server of claim 21 wherein the breakout request comprises a route entry field in the session initiation protocol invite message that replaces a Uniform Resource Identifier (URI) of the S-CSCF with the application server to provide the direct service route.

* * * * *